(12) United States Patent
Rozier et al.

(10) Patent No.: US 8,451,987 B1
(45) Date of Patent: May 28, 2013

(54) DETECTING 911 SERVICE DISRUPTIONS

(75) Inventors: Hilah A. Rozier, Lenexa, KS (US);
Thomas Edward Hines, III, Belton, MO (US)

(73) Assignee: Sprint Communcations Company L.P., Overland Park, KS (US)

( * ) Notice: Subject to any disclaimer, the term of this patent is extended or adjusted under 35 U.S.C. 154(b) by 1565 days.

(21) Appl. No.: 11/955,914

(22) Filed: Dec. 13, 2007

(51) Int. Cl.
*H04M 11/04* (2006.01)
(52) U.S. Cl.
USPC ............................................. 379/45; 379/39
(58) Field of Classification Search
USPC .. 379/45, 39; 455/404.1–404.2, 456.1–456.3, 455/423–425
See application file for complete search history.

(56) References Cited

U.S. PATENT DOCUMENTS

| | | | |
|---|---|---|---|
| 2002/0127993 A1* | 9/2002 | Zappala | 455/404 |
| 2008/0020774 A1* | 1/2008 | Fancher et al. | 455/445 |
| 2008/0101553 A1* | 5/2008 | Goldman et al. | 379/45 |

FOREIGN PATENT DOCUMENTS

WO    WO 2006/021005 A2 *  2/2006

* cited by examiner

*Primary Examiner* — Brandon Miller

(57) ABSTRACT

Service disruptions in a 911 system are detected by receiving reports from mobile positioning centers that detail certain activities of the 911 system. These reports are compiled into a log. Parts of this log are then searched for conditions that would indicate a service disruption. For example, a certain number of errors appearing in the log in the last six hours may indicate a service disruption. If a condition that would indicate a service disruption is found, a notice is generated so that action may be taken.

20 Claims, 7 Drawing Sheets

US 8,451,987 B1

DETECTING 911 SERVICE DISRUPTIONS

TECHNICAL BACKGROUND

Telecommunication service providers are required to provide for emergency service calls. For instance, when a wireless caller places a 911 call, the service provider carrying or otherwise handling the call must have the capabilities to connect the caller to a public service answering point (PSAP). The PSAP selected to handle the call can then respond to the caller.

Typically, a single call processing center is assigned to a single region, such as a metropolitan region. Most regions include multiple PSAPs. A call processing center typically interfaces with the PSAPs to service emergency calls.

Occasionally, communications between a PSAP and a telecommunication carrier may be disrupted. This may be caused by a variety of reasons including equipment configuration errors, bad routing information, or malfunctioning equipment at either the PSAP or carrier. Since these service disruptions may constitute a risk to the public, and result in fines or other regulatory action against the carrier, it is important that 911 service disruptions be found and fixed in a timely manner.

Overview

Service disruptions in a 911 system are detected by receiving reports from mobile positioning centers that detail certain activities of the 911 system. These reports are compiled into a log. Parts of this log are then searched for conditions that would indicate a service disruption. For example, a certain number of errors appearing in the log in the last six hours may indicate a service disruption. If a condition that would indicate a service disruption is found, a notice is generated so that action may be taken.

A communication network that detects 911 service disruptions includes a location provisioning server that gathers reports on certain 911 service activities from mobile positioning centers. These reports are then analyzed to determine if a service disruption is occurring. For example, if the mobile positioning centers are indicating that there are an unusually large number of errors in the last hour, it may indicate a 911 service disruption.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
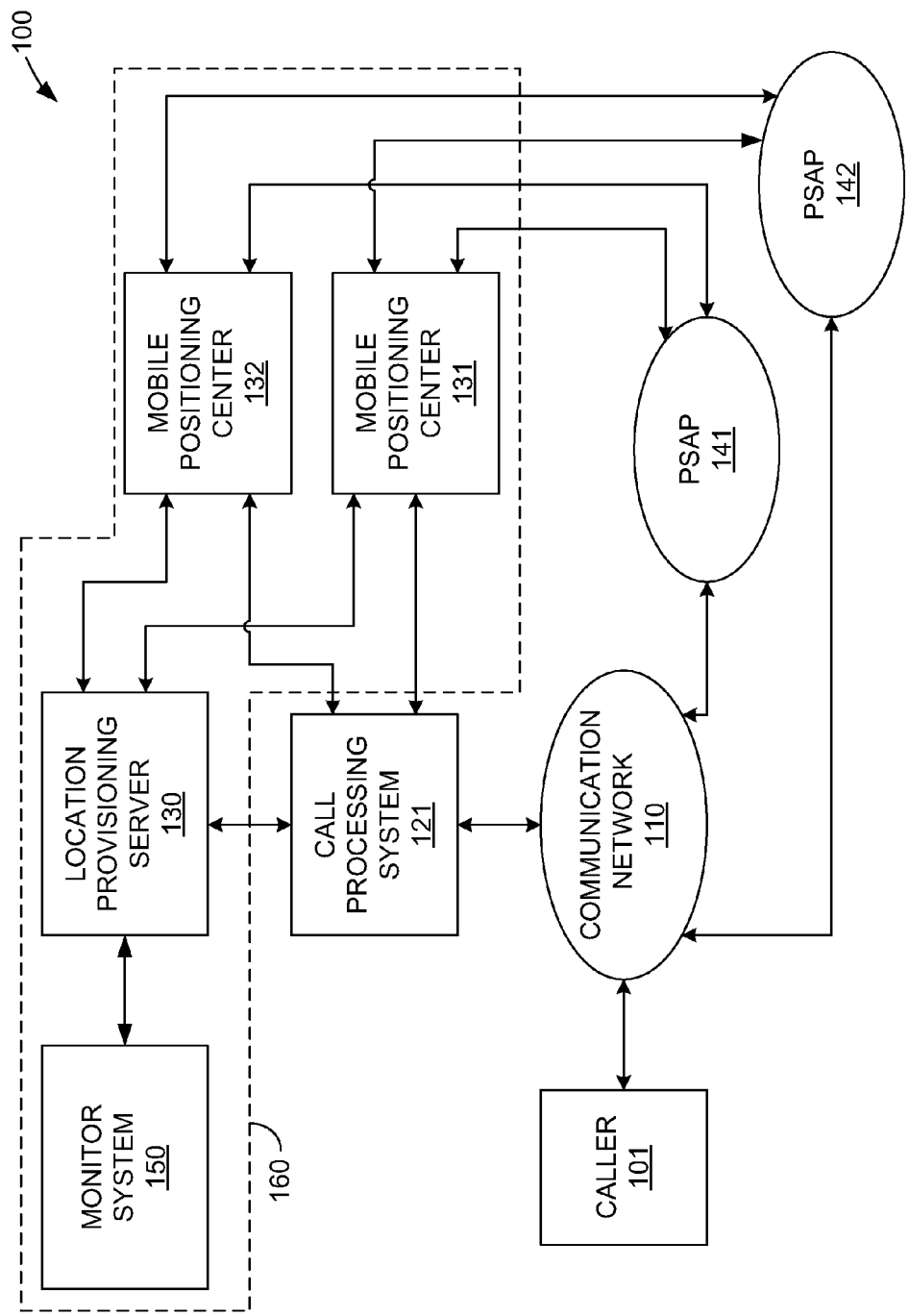
FIG. 1 is a block diagram illustrating a communication network in an embodiment of the invention.

FIG. 1 illustrates communication network 100 in an embodiment of the invention. Communication network 100 includes caller 101, communication network 110, call processing system (CPS) 121, public service answering point (PSAP) 141, PSAP 142, mobile positioning centers (MPC) 131 and 132, location provisioning server (LPS) 130, and monitor system 150. LPS 130 is operatively coupled to mobile positioning center 131 and mobile positioning center 132. Caller 101 is operatively coupled to communication network 110. CPS 121 is operatively coupled with communication network 110, LPS 130, and MPCs 131 and 132. PSAP 141 and PSAP 142 are both also operatively coupled with communication network 110, and both MPCs 131 and 132.

Communication network 110 may be any network or collection of networks that couple, link, or otherwise operatively connect caller 101 with CPS 121, caller 101 with either PSAP 141 or PSAP 142, and CPS 121 with either PSAP 141 or PSAP 142. It should be understood that communication network 110 may also connect CPS 121 with LPS 130, or with MPCs 131 and 132. Communication network 110 may also connect PSAP 141 and PSAP 142 with LPS 130, or with MPCs 131 and 132, or with monitor system 150. Communication network 110 may also connect monitor system 150 with LPS 130, or with MPCs 131 and 132, or with PSAPs 141 and 142, or with CPS 121. In other words, communication network 110 may connect any and all of the elements of communication network 100 with each other. However, other secondary data networks could be used. In an example, communication network 100 could include a backhaul network, a local network, a long distance network, or a packet network, or any combination thereof, as well as other types of networks.

Caller 101 could be any device, system, or other such communication platform capable of communicating with CPS 121 and PSAP 141 or PSAP 142 over communication network 110. Caller 101 could be, for example, a mobile phone, a wireless phone, or a wireline phone, a personal digital assistant (PDA), or any combination thereof, as well as any other type of device or system. Other types of communication platforms are possible.

CPS 121 could be any system or collection of systems capable of communicating with caller 101 and PSAP 141 or 142 to setup, tear-down, and otherwise handle an emergency service call. CPS 121 could also be capable of communicating with mobile positioning centers 131 and 132 to initiate location determination processes to determine the location of emergency service calls. CPS 121 could be, for example, a mobile switching center (MSC), a soft switch, a media gateway controller, or any combination or variation thereof, as well another type of call processing system.

Monitor system 150, location provisioning server 130, and mobile positioning centers 131 and 132 comprise location provisioning system 160. However, location provisioning system 160 may be any system or collection of systems capable of determining the location of callers to emergency services. It should be understood that location provisioning system 160 could include additional elements not pictured for the sake of clarity. For example, position determining equipment (PDE) could be included. Furthermore, a gateway system could be included to interface between PSAPs 141 and 142 and MPCs 131 and 132. An example of a gateway is an automatic location identification (ALI) gateway or database.

Figure 2:
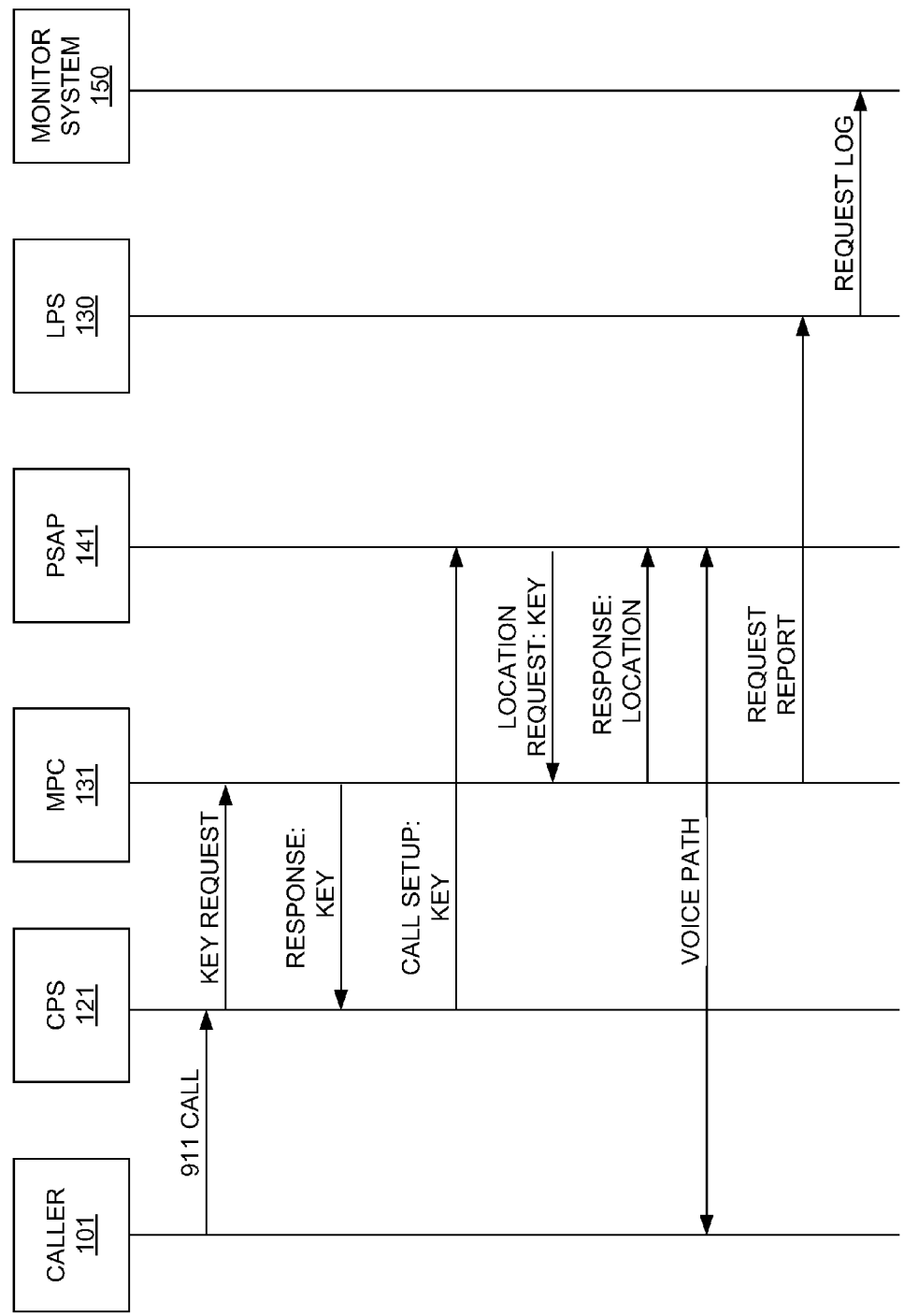
FIG. 2 is a flow diagram illustrating a lack of a service disruption in an embodiment of the invention.

FIG. 2 illustrates an operational flow diagram describing the operation of communication network 100 in an embodiment of the invention. FIG. 2 illustrates a case where CPS 121, MPC 131, and PSAP 141 are all functioning properly and 911 service is not disrupted. To begin, caller 101 places a 911 emergency services call to CPS 121. CPS 121 generally processes the call or call request to setup and connect the call to one of PSAP 141 or PSAP 142. CPS 121 selects either PSAP 141 or PSAP 142 based on the geographical location of caller 101. In the context of this example, it will be assumed that CPS 121 selects PSAP 141.

Mobile positioning centers 131 and 132 provide redundant location determination services for emergency calls placed to CPS 121. CPS 121 typically alternates communications between MPCs 131 and 132. In the context of this example, it will be assumed that CPS 121 selects MPC 131.

Upon receiving the call request, CPS 121 transmits a key request to MPC 131. The key request is typically part of a message sequence exchanged between CPS 121 and MPC 131 to determine the geographical location of caller 101.

MPCs 131 and 132 store a pool of keys that are assigned to each 911 call initiated by CPS 121. The key is used by CPS 121 and other call elements, such as those elements within PSAP 141 or 142, to correlate call information for the emergency services call. After selecting the key, MPC 131 provides the key to CPS 121. The key is thereafter reserved or restricted by both MPCs 131 and 132 from any use on any other calls.

CPS 121 responsively initiates call setup to PSAP 141, such as by transmitting call signaling. Included within the call setup process is a transfer of the key to PSAP 141. PSAP 141 queries MPC 131 with the key to obtain location information for caller 101. MPC 131 initially responds with the location information. PSAP 141 continues a message dialogue with MPC 131 to maintain the location information.

Ultimately, a voice path is established between caller 101 and a termination point within PSAP 141, such as a phone, terminal, or computer of personnel within PSAP 141. The personnel can direct other personnel, such as emergency service responders, to the location of caller 101.

MPC 131 may, from time to time, report to LPS 130 that it supplied CPS 121 with a key, and that PSAP 141 successfully made a location request with that key. MPC 131 may also report that it successfully fulfilled a location request from PSAP 141.

Figure 3:
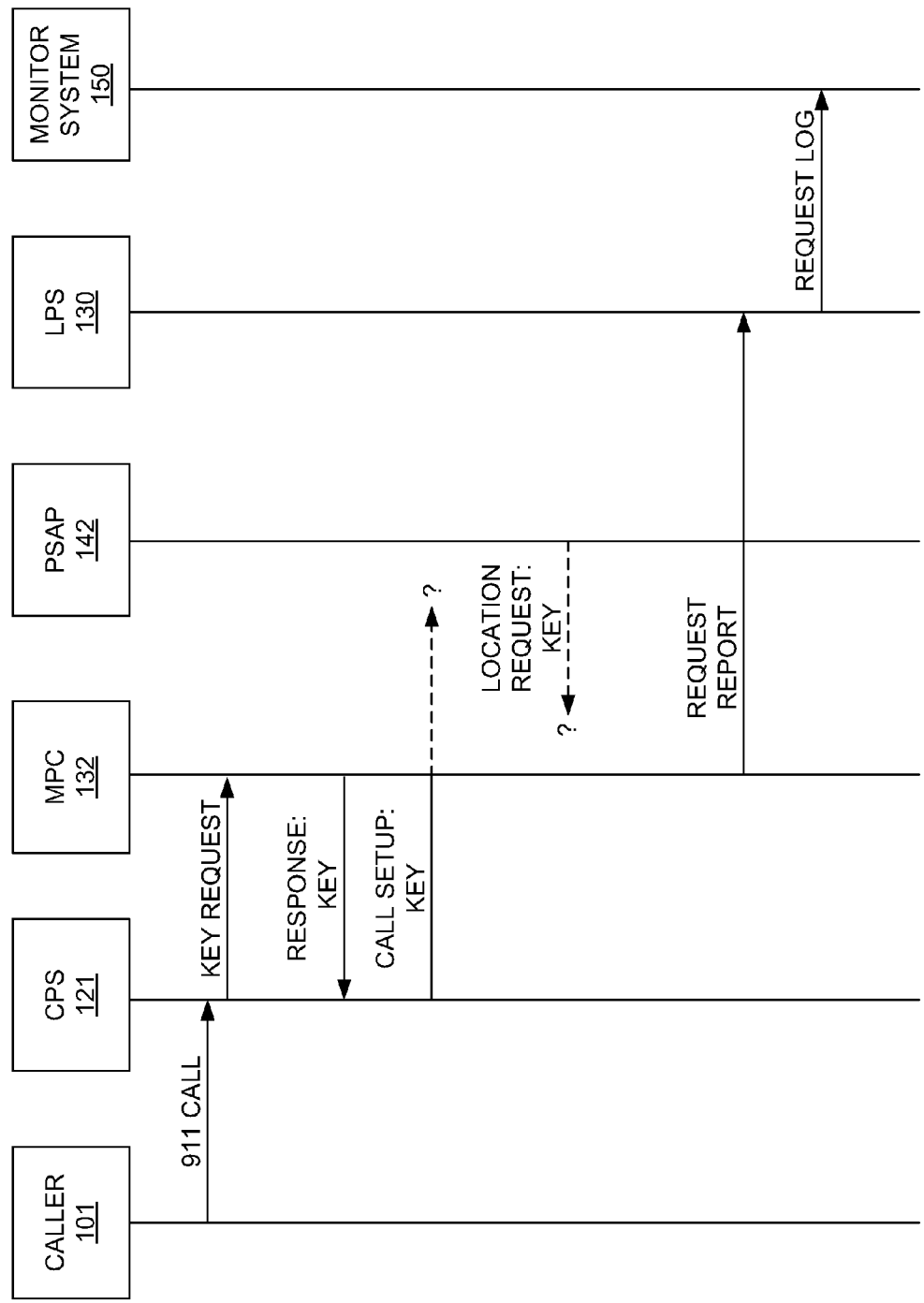
FIG. 3 is a flow diagram illustrating a service disruption in an embodiment of the invention.

FIG. 3 illustrates an operational flow diagram describing the operation of communication network 100 in an embodiment of the invention. FIG. 3 illustrates a case where at least one of CPS 121, MPC 131, and PSAP 141 is not functioning properly, or communicating properly, or there is some other problem and 911 service is disrupted. To begin, caller 101 places a 911 emergency services call to CPS 121. CPS 121 generally processes the call or call request to setup and connect the call to one of PSAP 141 or PSAP 1421. CPS 121 selects either PSAP 141 or PSAP 142 based on the geographical location of caller 101. In the context of this example, it will be assumed that CPS 121 selects PSAP 142.

Mobile positioning centers 131 and 132 provide redundant location determination services for emergency calls placed to CPS 121. CPS 121 typically alternates communications between MPCs 131 and 132. In the context of this example, it will be assumed that CPS 121 selects MPC 132.

Upon receiving the call request, CPS 121 transmits a key request to MPC 132. The key request is typically part of a message sequence exchanged between CPS 121 and MPC 132 to determine the geographical location of caller 101.

MPCs 131 and 132 store a pool of keys that are assigned to each 911 call initiated by CPS 121. The key is used by CPS 121 and other call elements, such as those elements within PSAP 141 or 142, to correlate call information for the emergency services call. After selecting the key, MPC 132 provides the key to CPS 121. The key is thereafter reserved or restricted by both MPCs 131 and 132 from any use on any other calls.

Normally, CPS 121 responsively initiates call setup to PSAP 142, such as by transmitting call signaling. However, if there is a problem with CPS 121 or PSAP 142, or the link between them, the call setup to PSAP 142 may never be initiated or completed. This may mean that the call setup process does not successfully transfer of the key to PSAP 142. Therefore, since PSAP 142 does not have a key, it may not query MPC 132 with the key to obtain location information for caller 101. Accordingly, MPC 132 would not initially respond with the location information. Likewise PSAP 142 would not continue a message dialogue with MPC 132 to maintain the location information. In addition, because of the problem with CPS 121 or PSAP 142, a voice path may not be established between caller 101 and the termination point within PSAP 142. MPC 132 may, from time to time, report to LPS 130 that it supplied CPS 121 with a key, but PSAP 142 never made a location request with that key. MPC may also report that even though a location request was made with a key it supplied CPS 121, there was some problem with that request.

Alternatively, CPS 121 may successfully initiate and complete the call setup to PSAP 142. Included within the call setup process is a transfer of the key to PSAP 142. However, a problem with MPC 132 or PSAP 142, or the link between them, may result in PSAP 142 not supplying MPC 132 with a request, or with a key, to obtain location information for caller 101. This alternative, and the one discussed above, are 911 service disruptions since at least one aspect of the normal 911 functionality (e.g. voice communication or location information) is not provided to PSAP 142.

As shown in both FIG. 2 and FIG. 3, from time to time, MPC 131 and 132 may report information to LPS 130 about the keys that have been provided to CPS 121. MPCs 131 and 132 may also report information to LPS 130 about the location requests it received from PSAPs 141 and 142, such as whether PSAP 141 or 142 ever made a location request corresponding to a key supplied by MPC 131 or 142, or whether such location requests were successfully fulfilled. Collectively, for the purposes of this discussion, the information provided by an MPC to LPS 130 is referred to as a request report in that it is some form of a report or data containing information about requests made to, or processed by, an MPC. LPS 130 may then aggregate or process multiple request reports from one or more MPCs covering reports over a set or variable time period to generate a request log. This request log is supplied to the monitor system 150. Monitor system 150 may be separate from LPS 130. Monitor system 150 may also be a subsystem of LPS 130. Monitor system 150 may also be software executed by LPS 130.

Figure 4:
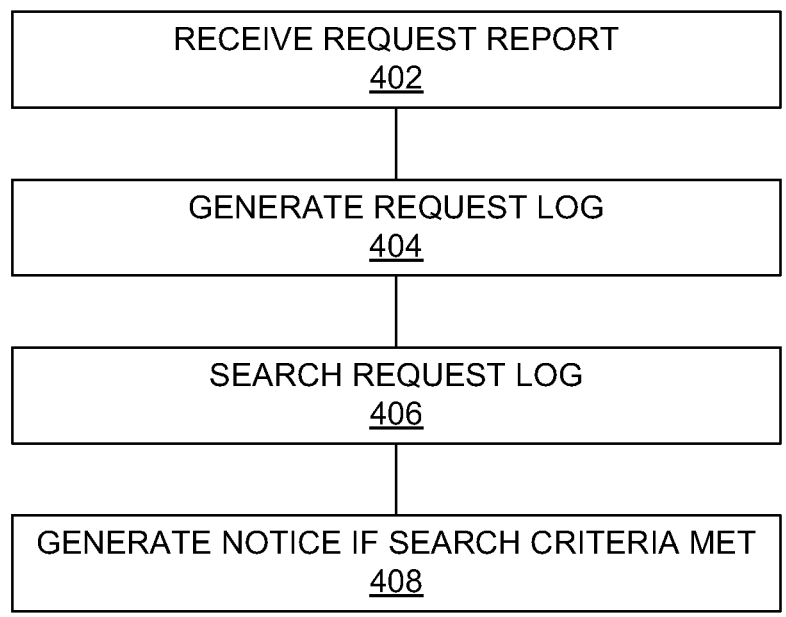
FIG. 4 is a flow diagram illustrating a method of detecting service disruptions in an embodiment of the invention.

FIG. 4 is a flow diagram illustrating a method of detecting service disruptions in an embodiment of the invention. This method may be performed by a computer, or multiple computers in communication with each other, or other hardware. The steps of this method may also be tangibly embodied on a computer readable medium. All or part of the method may be performed by monitoring system 150, LPS 130, communication network 100, or some portion of these elements.

In step 402, a request report is received. This request report may be aggregated with other request reports from the same or another source, or otherwise processed, such as by sorting or rearranging, to generate a request log in a step 404. In step 406, the request log is searched to determine if the log indicates that a potential service disruption has occurred. In step 408, a notice is generated if the search determined that criteria indicating a potential service disruption were met.

To further illustrate and explain the method shown in FIG. 4, consider an example communication network similar to the one shown in FIG. 1. In this exemplary system, MPCs 131 and 132 each supply request reports to LPS 130 that comprise fields with a unique call identifier, the date, time, and associated PSAP 141 or 142 of each key supplied to CPS 121. Additional, or possibly the same, request reports supplied to LPS 130 by either MPC 131 or 132 also comprise fields indicating a unique call identifier, a PSAP, and "no bid", "no query", "all fail", or some indication of success. In this example, supplying these request reports to LPS 130 corresponds to step 402.

In this example, LPS 130 processes the request reports from MPCs 130 and 131 into a form whereby all request reports for calls destined to a particular PSAP are grouped together. In other words, the request reports for PSAP 141 are grouped together and the request reports for PSAP 142 are grouped together. Additionally, these groupings may be ordered according to the date and time of the call. In this example, this processing corresponds to step 404.

In this example, the groupings are searched. For example, the grouping for PSAP 141 is searched and the search reveals that only 1% of the calls directed to PSAP 141 in the last three days resulted in the generation of a request report having either "no bid", "no query", or "all fail". This indicates that PSAP 141 is not suffering a service disruption because the percent of call failure indications is low. Other ratios (e.g. the number of successful queries to the number of unsuccessful queries), other indicators (e.g. a nearly one to one correspondence between calls and queries), other percentages (e.g. percent of calls with repeated location requests), or other criteria (e.g. a cross-check of redundant data spread over different entries in the log such as repeated location requests) or time periods may also be used to determine when service is adequate. The criteria and time period may be set by a user or administrator of communication network 100. Additionally, the criteria or time periods may be set automatically to default values, or to values determined by an artificial intelligence engine.

In another example, the grouping for PSAP 142 is searched and the search reveals that 98% of the calls directed to PSAP 142 in the last two hours resulted in the generation of a request report indicating "no query". This indicates that PSAP 142 is suffering a service disruption because the percent of call failure is high. Other ratios (e.g. the number of successful queries to the number of unsuccessful queries), other indicators (e.g. a nearly complete lack of queries), other percentages (e.g. percent of calls without repeated location requests), or other criteria (e.g. nonsense entries in the log) or time periods may also be used to determine when service is inadequate. The criteria and time period may be set by a user or administrator of communication network 100. Additionally, the criteria or time periods may be set automatically to default values, or to values determined by an artificial intelligence engine. In this example, these searches are examples of step 406.

In this example, if the search determines that a service disruption may be occurring, or may have occurred, a notice is generated. This notice may be, for example, an indication displayed on a computer screen. In another example, the notice may be an email alerting key personnel. A notice that indicates a potential service disruption does not exist may also be generated. In the foregoing example, generating a notice corresponds to step 408.

Figure 5:
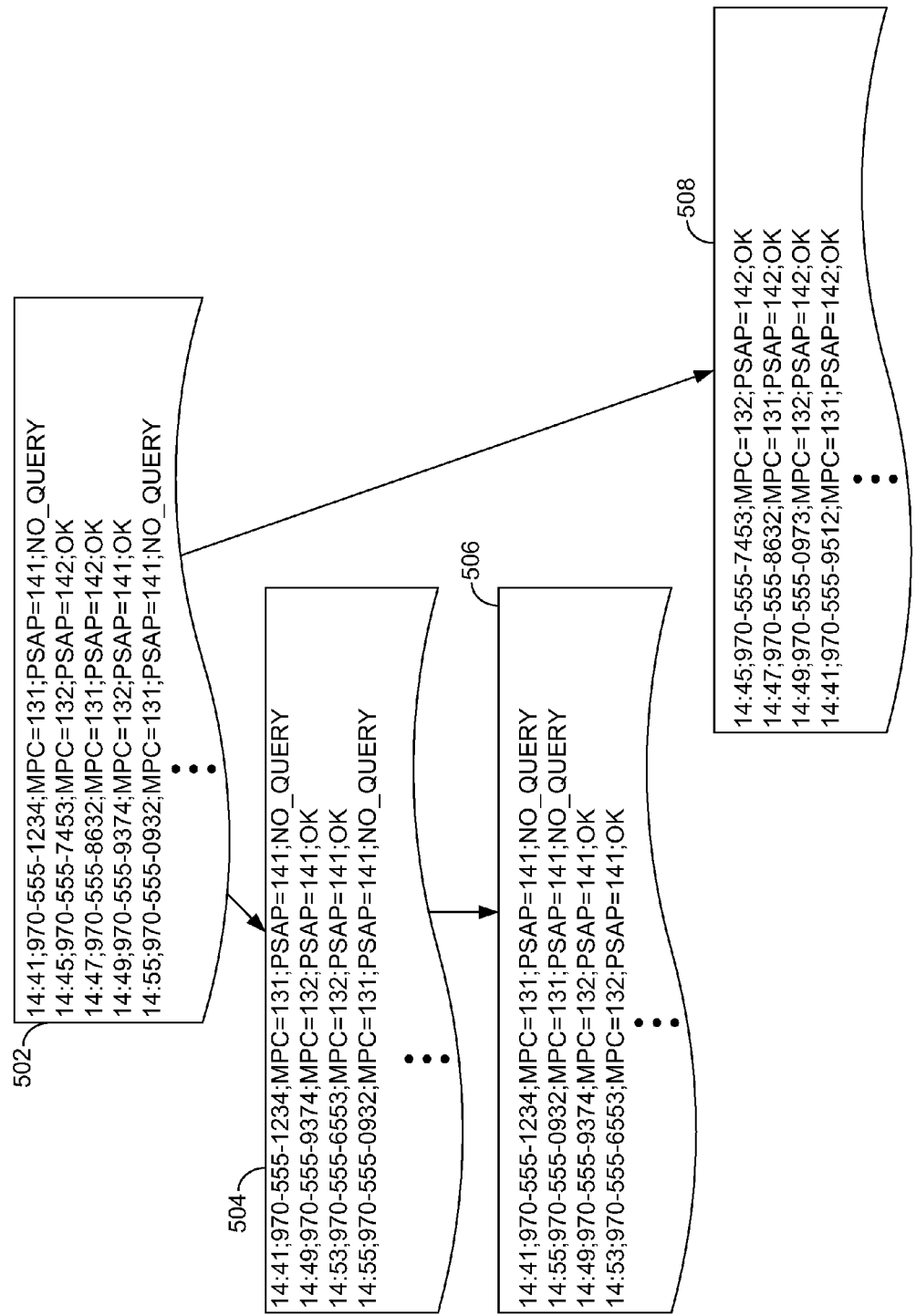
FIG. 5 illustrates grouping and sorting of request reports that may be used in an embodiment of the invention.

FIG. 5 illustrates grouping and sorting of request reports that may be used in an embodiment of the invention. In FIG. 5, an example request log 502 that is unsorted and ungrouped is shown. Request log 502 is divided into two groups 504 and 508 with group 504 containing the entries for PSAP 141 and group 508 containing the entries for PSAP 142. Note that all of the entries in group 508 indicate a successful or (a.k.a. "OK") transaction for the time period covered by request log 502. The lack of any non-successful transactions in log 508 indicates that 911 services associated with PSAP 142 is functioning. Group 504, however, contains some "no query" entries and some successful transactions. This, in itself, does not indicate a service disruption.

Group 504 is further sorted into group 506. This sort groups the entries by the MPC that serviced the request. After this sort, it can be seen that the requests serviced by MPC 131 and PSAP 141 all were unsuccessful (e.g "no query") while the requests serviced by MPC 132 were successful. Accordingly, it can be deduced that there is a service disruption and that it involves the interaction between MPC 131 and PSAP 141.

Figure 6:
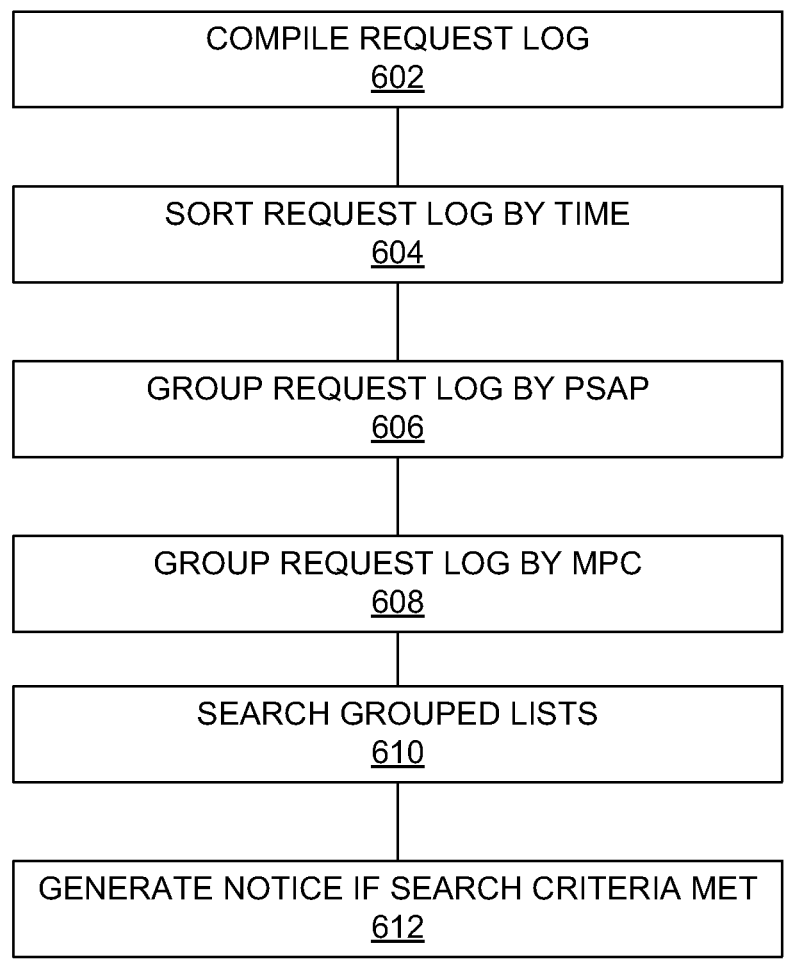
FIG. 6 is a flow diagram illustrating a method of detecting service disruptions in an embodiment of the invention.

FIG. 6 is a flow diagram illustrating a method of detecting service disruptions in an embodiment of the invention. This method may be performed by a computer, or multiple computers in communication with each other, or other hardware. The steps of this method may also be tangibly embodied on a computer readable medium. All or part of the method may be performed by monitor system 150, LPS 130, communication network 100, or some portion of these elements.

In step 502 a log of requests is compiled. This log may contain requests to MPC's 131 and 132 by PSAP's 141 and 142 and an indication of the success of the request along with other information such as the calling number and time. An example of this log is shown in FIG. 5 as log 502.

In step 604, the log is sorted by time. This sorting groups the entries so that limited time periods may be examined for service disruptions by, for example, discarding entries that are older than a given amount of time.

In step 606, the request log entries are grouped by PSAP. This grouping allows, for example, service disruptions that are associated with a given PSAP to be discovered. For example, if all of the entries for a given PSAP indicate a failure, it can be concluded that there is a service disruption with that PSAP.

In step 608, the request log entries are further grouped by MPC. This grouping, for example, allows service disruptions that are associated with a given MPC to be discovered. For example, if all of the entries for a given MPC and PSAP indicate a failure, it can be concluded that there is a service disruption when a given MPC services requests by a certain PSAP. This may, for example, indicate a configuration error in the MPC's data associated with the PSAP. FIG. 5 shows an example of this in grouping 506.

In step 610, the grouped lists are searched to determine if there is an indication that a potential service disruption has occurred. In step 612, a notice is generated if the search determined that criteria indicating a potential service disruption were met.

The methods, systems, networks, devices, answering points, centers, equipment, and servers described above may be implemented with, contain, or be executed by one or more computer systems. The methods described above may also be stored on a computer readable medium. Many of the elements of communication network 100 may be, comprise, or include computers systems. This includes, but is not limited to caller 101, communication network 110, PSAPs 141 and 142, MPCs 131 and 132, CPS 121, LPS 130, monitor system 150, and location provisioning system 160. These computer systems are illustrated, by way of example, in FIG. 7.

Figure 7:
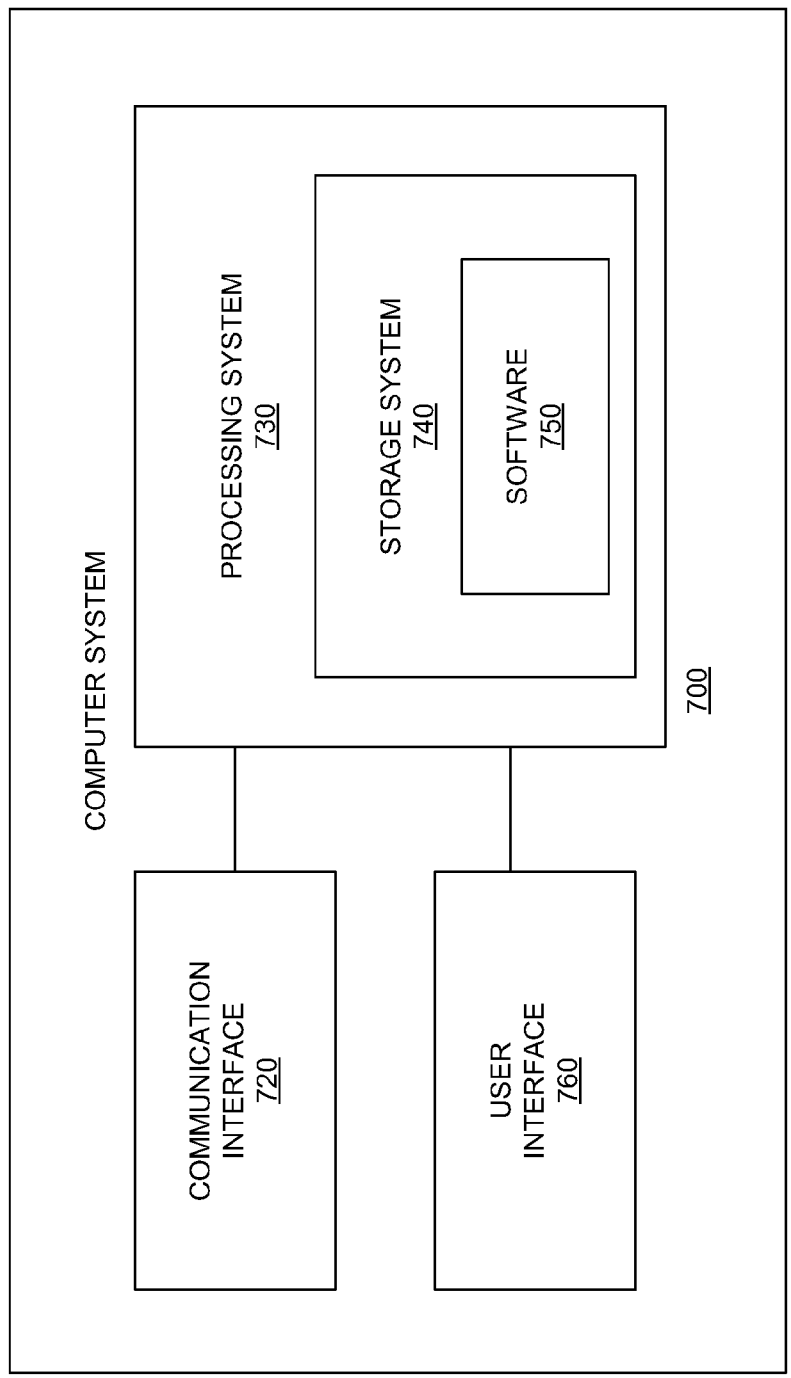
FIG. 7 is a block diagram illustrating a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of detecting 911 service disruptions, the method comprising:
   receiving a request report from a mobile positioning center, wherein the request report comprises a plurality of requests made to the mobile positioning center;
   processing the request report to generate a request log comprising the plurality of requests made to the mobile positioning center;
   generating a group of entries of the request log associated with a public service answering point;
   searching the group of entries of the request log for a search criteria that was satisfied over a limited time window; and
   generating a notice if said search criteria is satisfied over said limited time window.

2. The method of claim 1, wherein said searching comprises counting a number of failure indications reported by said mobile positioning center.

3. The method of claim 1, wherein said limited time window is configurable.

4. The method of claim 1, wherein said searching comprises counting a number of indications reported by said mobile positioning center that correspond to the public service answering point.

5. The method of claim 1, wherein said search criteria comprises a ratio of a first type of indication to a second type of indication.

6. The method of claim 1, wherein said search criteria comprises a cross-check of redundant data.

7. The method of claim 1, wherein a number of indications reported by said mobile positioning center that correspond to the public service answering point are counted and said search criteria is satisfied by comparing said number of indications to a threshold value.

8. A communication network that detects 911 service disruptions, comprising:
   a mobile positioning center that generates a request report, wherein the request report comprises a plurality of requests made to the mobile positioning center;
   a location provisioning system that receives said request report, processes the request report to generate a request log comprising the plurality of requests made to the mobile positioning center, and generates a group of entries of the request log associated with a public service answering point; and
   a monitor system configured to receive said request log and search the group of entries of the request log to determine if a search criteria was satisfied over a limited time window, said monitor system also generating a notice if said search criteria was satisfied over said limited time window.

9. The communication network of claim 8, wherein the monitor system configured to search the group of entries of the request log comprises the monitor system configured to count a number of failure indications indicated by said request log.

10. The communication network of claim 8, wherein said limited time window is configurable.

11. The communication network of claim 8, wherein the monitor system configured to search the group of entries of the request log comprises the monitor system configured to count a number of indications indicated by said request log that correspond to the public service answering point.

12. The communication network of claim 8, wherein said search criteria comprises a ratio of a first indicator to a second indicator.

13. The communication network of claim 8, wherein said search criteria comprises a cross-check of redundant data.

14. The communication network of claim 8, wherein a number of indications in said request report are correlated to the public service answering point and counted to produce a count and said count is compared to a threshold value.

15. A program storage device to detect 911 service disruptions, the program storage device comprising:
   software instructions configured, when executed by a computer system, to direct the computer system to receive a request report from a mobile positioning center, wherein the request report comprises a plurality of requests made to the mobile positioning center, process the request report to generate a request log comprising the plurality of requests made to the mobile positioning center, generate a group of entries of the request log associated with a public service answering point, search the group of entries of the request log for a search criteria that was satisfied over a limited time window, and generate a notice if the search criteria is satisfied over the limited time window; and at least one non-transitory computer-readable storage medium storing the software instructions.

16. The program storage device of claim 15, wherein the software instructions configured to direct the computer system to search the group of entries of the request log for the search criteria comprises the software instructions configured to direct the computer system to count a number of failure indications reported by said mobile positioning center.

17. The program storage device of claim 15, wherein said limited time window is configurable.

18. The program storage device of claim 15, wherein the software instructions configured to direct the computer system to search the group of entries of the request log for the search criteria comprises the software instructions configured to direct the computer system to count a number of indications reported by said mobile positioning center that correspond to the public service answering point.

19. The program storage device of claim 15, wherein said search criteria comprises a ratio of a first type of indication to a second type of indication.

20. The program storage device of claim 15, wherein a number of indications reported by said mobile positioning center that correspond to the public service answering point are counted and said search criteria is satisfied by comparing said number of indications to a threshold value.

* * * * *